(12) United States Patent
Gañán-Calvo et al.

(10) Patent No.: US 6,241,159 B1
(45) Date of Patent: Jun. 5, 2001

(54) LIQUID ATOMIZATION PROCEDURE

(75) Inventors: Alfonso Gañán-Calvo; Antonio Barrero Ripoll, both of Sevilla (ES)

(73) Assignee: Universidad de Sevilla, Sevilla (ES)

( * ) Notice: Subject to any disclaimer, the term of this patent is extended or adjusted under 35 U.S.C. 154(b) by 0 days.

(21) Appl. No.: 09/640,504

(22) Filed: Aug. 16, 2000

Related U.S. Application Data

(63) Continuation of application No. 09/171,518, filed as application No. PCT/ES97/00034 on Feb. 18, 1997, now Pat. No. 6,119,953.

(30) Foreign Application Priority Data

May 13, 1996 (ES) ..................................................... 9601101

(51) Int. Cl.$^7$ ................ A62C 5/02; B05B 1/28
(52) U.S. Cl. ............... 239/8; 239/290; 239/346; 239/371; 239/424; 239/566; 261/76; 261/78.1; 261/115
(58) Field of Search ................ 239/8, 86, 290, 239/291, 338, 346, 371, 400, 418, 419, 419.3, 422, 423, 424, 428, 434.5, 548, 566, 568; 424/45; 261/76, 78.1, 78.2, 115, 116

(56) References Cited

U.S. PATENT DOCUMENTS

| | | |
|---|---|---|
| 3,700,170 | 10/1972 | Blanka et al. . |
| 3,804,255 | 4/1974 | Speece . |
| 4,141,055 | 2/1979 | Berry et al. . |

(List continued on next page.)

FOREIGN PATENT DOCUMENTS

| | | |
|---|---|---|
| 563807 | 7/1975 | (CH) . |
| 4031262A1 | 4/1992 | (DE) . |
| 0 249 186 A1 | 12/1987 | (EP) . |
| 0 250 164 A2 | 12/1987 | (EP) . |
| 2255291A | 11/1992 | (GB) . |
| 2099078A | 12/1992 | (GB) . |
| 59-174561A | 10/1984 | (JP) . |
| 03169331 | 7/1991 | (JP) . |
| WO 90/05583 | 5/1990 | (WO) . |
| WO 91/18682 | 12/1991 | (WO) . |
| WO 94/11116 | 5/1994 | (WO) . |
| WO 94/23129 | 10/1994 | (WO) . |
| WO 95/23030 | 8/1995 | (WO) . |
| WO 96/16326 | 5/1996 | (WO) . |
| WO 97/43048 | 11/1997 | (WO) . |
| WO 97/44080 | 11/1997 | (WO) . |

OTHER PUBLICATIONS

Bowden et al., Science 276:233–5 (1997).
Brenn et al., *Chemical Engineering Science*, 52(2):237–244 (Jan. 1997) (Abstract).
Borchardt et al., *Chemistry & Biology*, 4(12):961–968 (1997).
Chin et al., *Trans. ASME J. Eng. Gas Turbines Power*, 106:639–644 (1983).
Cloupeau et al. (1989), *J. Electrostat* 22:135–159.

(List continued on next page.)

*Primary Examiner*—David A. Scherbel
*Assistant Examiner*—Steven J. Ganey
(74) *Attorney, Agent, or Firm*—Karl Bozicevic; Bozicevic, Field & Francis LLP

(57) ABSTRACT

The object of the present invention is a liquid atomization procedure that uses appropriate geometric parameters and physical properties to ensure that the liquid to be atomized is discharged as a continuous, steady capillary microjet through a suitable orifice. The procedure relies on the microwithdrawal effect undergone by a liquid-gas interface when the gas is withdrawn from a point (orifice) near the liquid surface. The invented procedure is applicable to any mechanism involving homogeneous atomization of liquids (particularly electronic fuel injection).

11 Claims, 1 Drawing Sheet

U.S. PATENT DOCUMENTS

Figure 1:
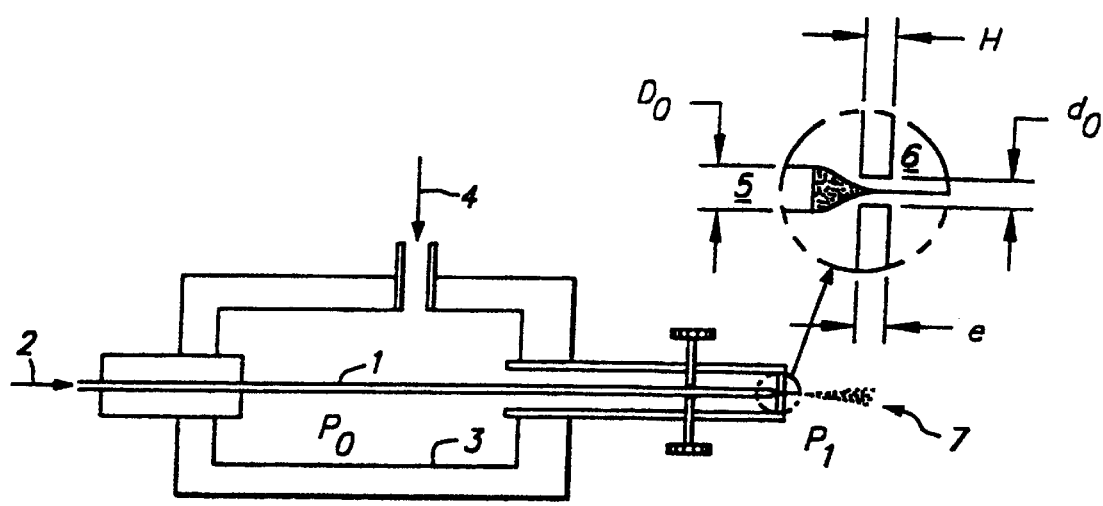

| | | |
|---|---|---|
| 4,162,282 | 7/1979 | Fulwyler et al. . |
| 4,171,049 | 10/1979 | Green et al. . |
| 4,347,935 | 9/1982 | Merrill . |
| 4,352,789 | 10/1982 | Thiel . |
| 4,363,446 | 12/1982 | Jaeggle et al. . |
| 4,444,961 | 4/1984 | Timm . |
| 4,603,671 | 8/1986 | Yoshinaga et al. . |
| 4,617,898 | 10/1986 | Gayler . |
| 4,628,040 | 12/1986 | Green et al. . |
| 4,662,338 | 5/1987 | Itoh et al. . |
| 4,781,968 | 11/1988 | Kellerman . |
| 4,783,008 * | 11/1988 | Ikeuchi et al. ............ 239/424 X |
| 4,917,857 | 4/1990 | Jaeckel . |
| 5,020,498 | 6/1991 | Linder et al. . |
| 5,077,176 | 12/1991 | Baggio et al. . |
| 5,087,292 | 2/1992 | Garrido . |
| 5,174,247 | 12/1992 | Tosa et al. . |
| 5,180,465 | 1/1993 | Seki et al. . |
| 5,194,915 | 3/1993 | Gilby . |
| 5,230,850 | 7/1993 | Lewis . |
| 5,364,632 | 11/1994 | Benita et al. . |
| 5,364,838 | 11/1994 | Rubsamen . |
| 5,372,867 | 12/1994 | Hasegawa et al. . |
| 5,397,001 | 3/1995 | Yoon et al. . |
| 5,404,871 | 4/1995 | Goodman et al. . |
| 5,458,292 | 10/1995 | Hapeman . |
| 5,522,385 | 6/1996 | Lloyd et al. . |
| 5,554,646 | 9/1996 | Cook et al. . |
| 5,597,491 | 1/1997 | Winkler . |
| 5,697,341 | 12/1997 | Ausman et al. . |
| 5,740,794 | 4/1998 | Smith et al. . |
| 5,775,320 | 7/1998 | Patton et al. . |

OTHER PUBLICATIONS

Fernández de la Mora et al., (1994), *J. Fluid Mech*.260:155–184.

Forbes et al., *J. Austral. Math. Soc. Ser. B.*, 32:231–249 (1990).

Gañán–Calvo et al. (1997), *J. Aerosol Sci.*, 28:249–275.

Gauthier, *Optics & Laser Technology*, 29(7): 389–399 (Oct. 1997).

Hartman et al. (1997), "Electrohydrodynamic Atomization in the Cone–Jet Mode," Paper presented at the ESF Workshop on Electrospray, Sevilla, Feb. 28–Mar. 1, 1997 [see also the papers contained in the Special Issue for Electrosprays (1994)].

Huck et al., *Journal of American Chemical Society* pp. 8267–8268 (1998).

Jasuja, *ASME Paper* 82–GT–32 (1982).

Liu et al., (1974), *J. Coloid Interface Sci.* 47:155–171.

Lorenzetto et al., *AIAA J.*, 15:1006–1010 (1977).

Nukiyama et al., *Trans. Soc. Mech. Eng. Jpn.*, 5:68–75 (1939).

Lord Rayleigh (1879), *Proc. London Math. Soc.* 10:4–13.

Risk et al., *Trans. ASME J. Eng. Gas Turbines Power*, 106:639–644 (1983).

Service et al., (1997), *Science*, 277:1199–1200.

Singler et al., *Phys. Fluids A*, 5:1156–1166 (1993).

Tuck et al., *J. Austral. Math. Soc. Ser. B.*, 25:433–450 (1984).

Ünal, *Metall. Trans. B.*, 20B:613–622 (1989).

Whitesides et al., *Science* 254:1312–9 (1991).

Wigg, *J. Inst. Fuel*, 27:500–505 (1964).

Winfree et al., *Nature*, 394539–44, (1998).

\* cited by examiner

LIQUID ATOMIZATION PROCEDURE

CROSS-REFERENCES

This application is a continuation of earlier filed application Ser. No. 09/171,518 filed Apr. 21, 1999 (issued as U.S. Pat. No. 6,119,953 on Sep. 19, 2000) which application is the national phase filing of PCT application no. PCT/ES97/00034 filed Feb. 18, 1997 which application is based on Spanish application no. 9702654 filed Dec. 17, 1997 to which applications are claimed priority and which applications are incorporated herein by reference.

FIELD OF THE INVENTION

The present invention relates generally to the field of liquid atomization and more particularly to a procedure that uses appropriate geometric parameters and physical properties to ensure that the liquid to be atomized is discharged as a continuous, steady capillary microjet through a suitable orifice.

BACKGROUND OF THE TECHNIQUE

Combined withdrawal of an interface between two immiscible fluids (two liquids or a liquid and a gas) has recently been studied by authors such as E. O. Tuck and J. M. van den Broek ("A cusp-like free surface flow due to a submerged source or sink", J. Austral. Math. Soc. Ser. B., 25, 433–450, 1984); L. K. Forbes and G. C. Hocking ("Flow caused by a point sink in a fluid having a free surface", J. Austral. Math. Soc. Ser. B., 32, 231–249, 1990); and T. J. Singler and J. F. Geer Singler ("A hybrid perturbation-Galerkin solution to a problem in selective withdrawal", Phys. Fluids A, 5, 1156–1166, 1993). It is acknowledged to be a particular case of a more general interfacial instability phenomenon known as selective withdrawal/combined withdrawal. Studies in this field have focused largely on the determination of parameters (e.g. the distance from the sink to the free surface, the fluid density ratio, the surface tension between the fluids) at the onset of combined withdrawal (i.e. of sweeping of the fluid behind the free surface when the fluid in front of it is withdrawn at a given distance from the surface). However, the fluid dynamics of the microjet produced by combined withdrawal seemingly remains unexplored. The observation and study of the microjet, its peculiar properties and its potential uses, led to the present atomization procedure.

Existing atomization methods convert the type of energy supplied to the system (e.g. kinetic energy of the gas in pneumatic atomizers, electrical energy in sonic and ultrasonic piezoelectric atomizers, mechanical energy in rotary atomizers, electrostatic energy in electrohydrodynamic atomizers, etc.) into surface tension free energy since the liquid-gas surface is dramatically expanded by the effect of these processes. As a function of the resulting degree of disorder, part of the energy is also degraded in the statistical dispersion of the resulting drop sizes. Depending on how disorderly and rapidly (or gradually and efficiently) the processes by which the above-mentioned energies are converted into free surface energy take place, the resulting sprays are suitable for different specific uses.

As a rule, the spray should consist of small drops of uniform size. A small drop size is always in conflict with a high flow-rate in the fluid to be atomized, which results in high energy use per time unit. Also, uniformity in drop size relies on gradual, non-turbulent, scarcely random processes that are incompatible with the rapid conversion of volumetric energy into surface energy required by the typically high liquid flow-rates involved in many cases and with technological simplicity in the atomizer. Mechanical simplicity and expeditiousness in the atomizer, and irreversibility and randomness in the atomization process, are all highly correlated.

Existing pneumatic atomizers involve the cascading breaking of the interface from a high Weber number to a unity Weber number, the latter being accomplished when drop diameters are such that surface tension forces offset the inertia of the gas relative to the liquid. Such atomizers include the straightforward coaxial model of S. Nukiyama and Y. Tanasawa ("Experiments on the atomization of liquids in the airstream", Trans. Soc. Mech. Eng. Jpn., 5, 68–75, 1939) or the airblast models developed by I. D. Wigg ("Drop-size predictions for twin fluid atomizers," J. Inst. Fuel, 27, 500–505, 1964), G. E. Lorenzetto and A. H. Lefebvre ("Measurements of drop size on a plain jet airblast atomizer", AIAA J., 15, 1006–1010, 1977), A. K. Jasuja ("Plain-jet airblast atomization of alternative liquid petroleum fuels under high ambient air pressure conditions", ASME Paper 82-GT-32. 1982), and N. K. Risk and A. H. Lefebvre ("Spray characteristics of plain-jet-airblast atomizers", Trans. ASME J. Eng. Gas Turbines Power, 106, 639–644, 1983), among many others, or that reported by A. Ünal ("Flow separation and liquid rundown in gas-atomization process", Metall. Trans. B., 20B, 613–622, 1989), based on the coaxial atomization of a liquid metal using a supersonic gas flow.

Cascading processes in existing pneumatic atomizers involved highly turbulent flows and randomness, which result in highly disperse drop size and atomizates.

One other major disadvantage of this type of atomizer is the limited sizes it provides (above 20 microns on average at best).

Whistling atomizers also have their pitfalls, prominent among which are noise, a relative complexity—they use wave generators and piezoelectric devices to excite the capillary jet produced—, and a limited drop size (usually larger than 50 μm).

One novel atomization system that also provides extremely small, monodisperse drop sizes is electrostatic or electrospray atomization. The system has been disclosed (e.g by M. L. Colelough and T. J. Noakes, "Apparatus and process for producing powders and other granular materials", European Patent Application 87305187.4, 1987). The chief disadvantage of this method in many cases is that it requires using a high-voltage dc source—which poses serious problems—and hence a discharge system (e.g. electrical crowns), both of which add up to the inherent complexity, large weight and low manipulability of this system.

SUMMARY OF THE INVENTION

The present invention is a liquid atomization procedure based of the withdrawal of the liquid to be atomized by a gas flow. The liquid flows through a feeding point housed in a pressure chamber. The feeding point faces an orifice that communicates the pressure chamber with the outside. The withdrawing gas flows across the chamber and surrounds the liquid to be atomized, delivered by the feeding point, to form the atomizate.

The object of this patent application provides drops of extremely small (1 micron or less) and highly monodisperse size (depending on the operating conditions, the relative standard deviation is 10–30%). The proposed system also possesses the simplicity and economy of a pneumatic system. In addition, drop size can be adjusted at will via the flow-rate of the injected liquid and the pressure drop across the pressure chamber, from which the liquid jet is concentrically and axially withdrawn.

The capillary microjet formed by liquid flowing from the feeding point to the exit of the pressure changer is accelerated and stabilized by tangential viscous stress exerted by the gas on the liquid surface. The microjet leaves the pressure chamber through the exit orifice and then splits into microdrops with the following properties:

(1) an extremely small size (1 micron or less) resulting from breakage of the capillary microjet, and (2) very low size dispersion provided the jet diameter is stable, which is the case as long as the liquid flow-rate of the jet is stable.

BRIEF DESCRIPTION OF THE FIGURE

FIG. 1 is a schematic depiction of an atomizer of the invention.

DETAILED DESCRIPTION OF THE INVENTION

Formation of the microjet and its acceleration are based on the abrupt pressure drop associated with the steep acceleration experienced by the gas on passing through the orifice. This results in a large pressure difference between the liquid and gas, which in turn produces a highly curved zone on the liquid surface near the orifice and in the formation of a cuspidal point from which a steady microjet flows provided the amount of liquid withdrawn through the orifice is replenished.

The parameter window used (i.e. the set of special values for the liquid properties, flow-rate used, feeding needle diameter, orifice diameter, pressure ratio, etc.) should be large enough to be compatible with virtually any liquid (dynamic viscosities in the range from $10^{-4}$ to 1 kg $m^{-1}$ $s^{-1}$); in this way, the capillary microjet that emerges from the end of the feeding needle is absolutely stable and perturbations produced by breakage of the jet cannot travel upstream. Downstream, the microjet splits evenly shaped drops simply by effect of capillary instability (see, for example, Raileigh, "On the instability of jets", Proc. London Math. Soc., 4–13, 1878), similarly to a laminar capillary jet falling from a half-open tap.

When the stationary, steady regime is reached, the capillary jet that emerges from the end of the drop at the outlet of the feeding point is concentrically withdrawn into the nozzle. After the jet emerges from the drop, the liquid is accelerated by tangential sweeping forces exerted by the gas stream flowing on its surface, which gradually decreases the jet cross-section.

The forces exerted by the gas flow on the liquid surface should be steady enough to prevent surface oscillations. Therefore, any turbulence in the gas motion should be avoided: even if the gas velocity is high, the characteristic size of the orifice should ensure that the gas motion is laminar (similarly to the boundary layers formed on the jet and on the inner surface of the nozzle or hole).

In summary, the gas flow, which effects the liquid withdrawal and its subsequent acceleration after the jet is formed, should be very rapid, but also uniform, in order to avoid perturbing the fragile capillary interface (the surface of the drop that emerges from the jet) and hence its breaking. Therefore, the dynamic forces exerted by the gas should never exceed the surface tension (drop and microjet) at any time during the process. In terms of non-dimensional fluid dynamics numbers, the Weber number (i.e. the dynamic to surface tension force ratio) should not exceed unity during the process. The Weber number for the microjet will inevitably be unity because the pressure drop in the gas is similar in magnitude to the effect of the surface tension:

$$\frac{2\gamma}{d_j} \sim \frac{1}{2}\rho v_g^2$$

where $\gamma$ and $\rho$ are the surface tension and liquid density, respectively; and $d_j$ and $v_g$ are the characteristic diameter of the jet and characteristic velocity of the gas. Also, the velocity of the gas around the drop that produces the jet must be related to that across the orifice via the areas, i.e. $V_g D_0^2 \sim v_g d_0^2$, where $V_g$ is the velocity of the gas around the drop, and $D_0$ and $d_0$ are the diameters of the feeding point and orifice, respectively. Since the maximum possible gas velocity at the orifice is similar to the speed of sound, one has $$V_g \sim \left(\frac{d_0}{D_0}\right)^2 \times 320\,\mathrm{m/s}$$

and, for the jet diameter, $$d_j \sim \frac{4\gamma}{\rho_g v_g^2} \sim \frac{4\times 2\times 10^2}{1.2\times 320^2} \sim 5\,\mu m(\gamma = 2\times 10^2\ N/m^2 \text{ for } n\text{-heptane})$$

This suggests that micrometric drop sizes can be obtained.

At the smallest diameters possible with this system (similar to the thickness of the boundary layer), the kinetic energies per unit volume of the liquid and gas should be of the same order. The resulting liquid velocity will be $$V_l \sim \left(\frac{\rho_g}{\rho_1}\right)^{1/2} v_g \sim 10\,\mathrm{m/s}$$

where $\rho_l$ is he liquid density. From the previous equation, the liquid flow-rate turns out to be $$Q_l \sim d_j^2 v_l \sim 10^{-11}\ \mathrm{m^3/s}$$

at the smallest drop sizes.

The gas flow should be laminar in order to avoid a turbulent regime—turbulent fluctuations in the gas flow, which has a high frequency, would perturb the liquid-gas interface. The Reynolds reached at the orifice are $$Re = \frac{v_g d_0}{\nu_g} \sim 4000$$

where $\nu_g$ is the kinematic viscosity of the gas. Even though this number is quite high, there are large pressure gradients downstream (a highly convergent geometry), so a turbulent regime is very unlikely to develop.

The essential difference from existing pneumatic atomizers (which possess large Weber numbers) is that the aim is not to rupture the liquid-gas interface but the opposite, i.e. to increase the stability of the interface until a capillary jet is obtained. The jet, which will be very thin provided the pressure drop resulting from withdrawal is high enough, splits into drops the sizes of which are much more uniform than those resulting from disorderly breakage of the liquid-gas interface in existing pneumatic atomizers.

The proposed procedure for atomizing liquids can be used for electronic fuel injection as well as in inhalers for delivery of drugs or anaesthesia and in nebulizers for chemical analyses, among others. Also, it affords mass production of ceramic powders and sintering semiconductors used to manufacture ceramic materials, semiconductors, plastics, etc.

In order to complement the above description and facilitate understanding the invention, this report includes an illustrative rather than limitative plan for a prototype model.

FIG. 1: Schematic depiction of an atomizer prototype.

1. Feeding needle.
2. End of the feeding needle used to insert the liquid to be atomized.
3. Pressure chamber.
4. Orifice used as gas inlet.
5. End of the feeding needle used to evacuate the liquid to be atomized.
6. Orifice through which withdrawal takes place.
7. Atomizate (spray).

$D_0$=diameter of the feeding needle; $d_o$=diameter of the orifice through which the microjet is passed; e=axial length of the orifice through which withdrawal takes place; H=distance from the feeding needle to the microjet outlet; $P_0$=pressure inside the chamber; $P_\alpha$=atmospheric pressure.

EXEMPLARY USES OF THE INVENTION

The proposed atomization system obviously requires delivery of the liquid to be atomized and the gas to be used in the resulting spray. Both should be fed at a rate ensuring that the system lies within the stable parameter window. Multiplexing is effective when the flow-rates needed exceed those on an individual cell. The flow-rates used should also ensure the mass ratio between the flows is compatible with the specifications of each application.

Obviously, the gas can be externally supplied at a higher flow-rate in specific applications (e.g. burning, drug inhalation) since this need not interfere with the atomizer operation.

The gas and liquid can be dispensed by any type of continuous delivery system (e.g. a compressor or a pressurized tank the former and a volumetric pump or a pressurized bottle the latter). If multiplexing is needed, the liquid flow-rate should be as uniform as possible among cells; this may entail propulsion through several capillary needles, porous media or any other medium capable of distributing a uniform flow among different feeding points.

Each individual atomization device should consist of a feeding point (a capillary needle, a point with an open microchannel, a microprotuberance on a continuous edge, etc.) 0.05–2 mm (but, preferentially 0.1–0.4 mm) in diameter, where the drop emerging from the microjet can be anchored, and a small orifice 0.05–2 mm (preferentially 0.1–0.25 mm) in diameter facing the drop and separated 0.1–2 mm (preferentially 0.2–0.5 mm) from the feeding point. The orifice communicates the withdrawal gas around the drop, at an increased pressure, with the zone where the atomizate is produced, at a decreased pressure.

The atomizer can be made from a variety of materials (metal, plastic, ceramics, glass); the choice is dictated by the projected application.

FIG. 1 depicts a tested prototype where the liquid to be atomized is inserted through one end of the system (2) and the propelling gas in introduced via the special inlet (4) in the pressure chamber (3). The prototype was tested at gas feeding rates from 100 to 2000 mBar above the atmospheric pressure $P_\alpha$ at which the atomized liquid was discharged. The whole enclosure around the feeding needle (1) was at a pressure $P_0 > P_\alpha$. The liquid feeding pressure, $P_1$, should always be slightly higher than the gas propelling pressure, $P_0$. Depending on the pressure drop in the needle and the liquid feeding system, the pressure difference ($P_1 - P_0 > 0$) and the flow-rate of the liquid to be atomized, Q, are linearly related provided the flow is laminar—which is indeed the case with this prototype. The critical dimensions are the distance from the needle to the plate (H), the needle diameter ($D_0$), the diameter of the orifice through which the microjet (6) is discharged ($d_0$) and the axial length, e, of the orifice (i.e. the thickness of the plate where the orifice is made). In this prototype, H was varied from 0.3 to 0.7 mm on constancy of the distances ($D_0$=0.45 mm, $d_0$–0.2 mm) and e–0.5 mm. The quality of the resulting spray (7) did not vary appreciably with changes in H provided the operating regime (i.e. stationary drop and microjet) was maintained. However, the system stability suffered at the longer H distances (about 0.7 mm). The other atomizer dimensions had no effect on the spray or the prototype functioning provided the zone around the needle (its diameter) was large enough relative to the feeding needle.

What is claimed is:

1. A method of simultaneously producing a plurality of stable microjets; comprising the steps of:

forcing a liquid through a first channel of a feeding source in a manner which causes the liquid to be expelled as a first jet;

forcing the liquid through a second channel of the feeding source in a manner which causes the liquid to be expelled as a second jet;

forcing a gas through a pressure chamber in a manner which causes the gas to exit the pressure chamber from a first opening positioned in front of a flow path of the first jet and simultaneously exit the pressure chamber from a second opening positioned in front of a flow path of the second jet;

allowing the first jet to emerge from the first opening and the second jet to emerge from the second opening thereby providing a plurality of stable microjets;

wherein a stable liquid-gas interface is maintained between the liquid of the first jet and the gas and the liquid of the second jet and the gas.

2. The method of claim 1, wherein the first jet and the second jet are each accelerated by tangential sweeping forces exerted by the gas on surfaces of the first and second jets.

3. The method of claim 1, wherein the first jet and the second jet are each decreased in cross-section after being expelled, respectively from the first channel and the second channel.

4. The method of claim 1, wherein forces exerted by the gas on surfaces of the first jet and the second jet are sufficiently steady to prevent oscillation of the surfaces of the first jet and second jet.

5. The method of claim 1, wherein the liquid has a viscosity in a range of from about $10^{-4}$ to about 1 kg/m/sec.

6. The method of claim 1, wherein the liquid has a viscosity in a range of from about $0.3 \times 10^{-3}$ to about $5 \times 10^{-2}$ kg/m/sec.

7. The method of claim 1, wherein the liquid is forced through the first and second channels at a rate in a range of about 1 nl/sec to about 100 µl/sec.

8. The method of claim 1, wherein the liquid is forced through the first and second hannels at a rate in a range of about 0.01 to about 10 µl/sec.

9. The method of claim 1, wherein the gas is forced through the first and second openings of the pressure chamber at a rate in the range of from about 50 m/sec to about 2000 m/sec.

10. The method of claim 1, wherein the gas is forced through the first and second openings of the pressure chamber at a rate in the range of from about 100 to 500 m/sec.

11. The method of claim 1, wherein the first and second openings in the pressure chamber are each circular and are respectively positioned directly in front of the first and second jets.

* * * * *

UNITED STATES PATENT AND TRADEMARK OFFICE
CERTIFICATE OF CORRECTION

PATENT NO.    : 6,241,159 B1
DATED         : June 5, 2001
INVENTOR(S)   : Alfonso Ganan-Calvo; Antonio Barrero Ripoll It is certified that error appears in the above-identified patent and that said Letters Patent is hereby corrected as shown below:

<u>Column 7, claim 8,</u>
Line 5, please change "hannels" to -- channels --.

Signed and Sealed this

Twenty-ninth Day of January, 2002

Attest:

Attesting Officer

JAMES E. ROGAN
Director of the United States Patent and Trademark Office